US008712251B2

(12) United States Patent
Koley et al.

(10) Patent No.: US 8,712,251 B2
(45) Date of Patent: Apr. 29, 2014

(54) TRANSPORT OF MULTIPLE ASYNCHRONOUS DATA STREAMS USING HIGHER ORDER MODULATION

(75) Inventors: Bikash Koley, Sunnyvale, CA (US); Vijayanand Vusirikala, Palo Alto, CA (US); Hong Liu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 232 days.

(21) Appl. No.: 13/089,437

(22) Filed: Apr. 19, 2011

(65) Prior Publication Data

US 2012/0269512 A1 Oct. 25, 2012

(51) Int. Cl.
*H04B 10/04* (2011.01)
(52) U.S. Cl.
USPC ........... 398/183; 398/135; 398/136; 398/188; 398/192; 398/193; 398/194; 398/154
(58) Field of Classification Search
USPC ........... 398/183, 188, 192, 193, 194, 195, 98, 398/202, 208, 209, 65, 158, 159, 154, 155, 398/79, 81, 25, 196, 197, 198, 185, 135, 398/136, 137, 138, 139
See application file for complete search history.

(56) References Cited

U.S. PATENT DOCUMENTS

| 6,697,345 | B1 | 2/2004 | Corrigan, III et al. |
| 6,707,822 | B1 | 3/2004 | Fadavi-Ardekani et al. |
| 7,555,061 | B2 * | 6/2009 | Katagiri et al. ............... 375/308 |
| 7,920,796 | B2 * | 4/2011 | Brownlee et al. ............. 398/188 |
| 2003/0016699 | A1 | 1/2003 | McClary et al. |
| 2008/0181618 | A1 * | 7/2008 | Tian et al. .................... 398/188 |
| 2011/0158641 | A1 * | 6/2011 | Barnard et al. ................ 398/25 |

FOREIGN PATENT DOCUMENTS

JP 2006042314 A 2/2006

OTHER PUBLICATIONS

International Search Report & Written Opinion dated Dec. 6, 2012 for application PCT/US2012/032055.
Yonenaga et al., "100Gbit/s All-Optical OFDM Transmission Using 4 × 25 Gbit/s Optical Duobinary Signals with Phase-Controlled Optical Sub-Carriers," 2008, IEEE, 3 pages.
Winzer et al., "Advanced Optical Modulation Formats," Proceedings of the IEEE, vol. 94, No. 5, May 2006, pp. 34.

\* cited by examiner

*Primary Examiner* — Hanh Phan
(74) *Attorney, Agent, or Firm* — Lerner, David, Littenberg, Krumholz & Mentlik, LLP

(57) ABSTRACT

Aspects of the invention provide transmitters and receivers for managing multiple optical signals. High order modulation, such as phase and/or amplitude modulation, is used to achieve multiple bits per symbol by transporting multiple asynchronous data streams in an optical transport system. One or more supplemental multiplexing techniques such as time division multiplexing, polarization multiplexing and sub-carrier multiplexing may be used in conjunction with the high order modulation processing. This may be done in various combinations to realize a highly spectrally efficient multi-data stream transport mechanism. The system receives a number of asynchronous signals which are unframed and synchronized, and then reframed and tagged prior to the high order modulation. Differential encoding may also be performed. Upon reception of the multiplexed optical signal, the receiver circuitry may employ either direct detection without a local oscillator or coherent detection with a local oscillator.

23 Claims, 11 Drawing Sheets

Square-16-QAM

FIG. 5A

Star-16-QAM

TRANSPORT OF MULTIPLE ASYNCHRONOUS DATA STREAMS USING HIGHER ORDER MODULATION

BACKGROUND OF THE INVENTION

1. Field of the Invention

The present invention is generally related to optical transport systems. More particularly, aspects of the present invention are directed to transportation of multiple asynchronous data streams over an optical transport system using high order modulation.

2. Description of Related Art

A number of existing networking scenarios involve the transporting of a number of data streams from routers or switches over various geographical areas, such as across a metropolitan area or a regional network, in a manner that optimizes the uses of available optical fiber spectrum. The incoming data streams are typically asynchronous, typically out of phase and with clock rates within +/−100 ppm, as they may arrive from different, independent sources.

Some solutions employ time division multiplexing ("TDM"), for instance using a Synchronous Optical NETwork ("SONET")/Synchronous Digital Hierarchy ("SDH") or Optical Transport Network ("OTN") hierarchy in which the lower speed services are synchronously multiplexed to a higher data rate for transmission. Other solutions employ Wavelength Division Multiplexing ("WDM"), where different incoming data streams are mapped to different wavelengths and then multiplexed on to a single fiber.

In TDM, the incoming asynchronous data streams are mapped to transport containers which are then TDM multiplexed to create a higher speed container. This higher speed container (stream) is then transmitted using a variety of optical modulation techniques ranging from simple on-off keying to high-order modulation based on phase and polarization. However, TDM is limited by the fastest electronic transmitting, receiving, channel impairment and processing technology available. Therefore, important deficiencies of TDM-only transport include the cost, complexity and power consumption burdens of the TDM multiplexing stage and subsequent de-serialization. In general, the TDM aggregation approach may introduce additional multiplexing/demultiplexing complexity as well as the cost premium of higher speed optics and electronics.

On the other hand, if conventional WDM technology (including Dense WDM "DWDM") is used to transport these lower-speed asynchronous signals, the spectral efficiency is very low. Hence, the full transmission capacity of the fiber may not be utilized.

SUMMARY OF THE INVENTION

Aspects of the invention address the cost and complexity issues of high-speed electronics and optics associated with a TDM approach and the spectral inefficiency of WDM with a lower-speed signals approach. As explained herein, it is possible to maintain a low baud rate for low cost optics and electronics while enabling a high bit rate for high spectral efficiency.

Embodiments of the invention provide high order modulation, such as phase and/or amplitude modulation to achieve multiple bits per symbol, for transport of multiple data streams in an optical transport system. Supplemental multiplexing techniques such as time division multiplexing, polarization multiplexing and sub-carrier multiplexing may also be used in conjunction with the high order modulation. This may be done in various combinations to realize a highly spectrally efficient multi-data stream transport mechanism.

According to one embodiment, an optical transmitter system comprises at least one module for performing unframing by removing framing information from a plurality of N asynchronous data streams and for synchronizing the asynchronous data streams. The system also comprises at least one module for re-framing the synchronized data streams and for tagging the synchronized data streams with encoded stream information. The system also comprises a high order modulator operable to perform $2^N$ level optical modulation of the tagged synchronized data streams prior to transmission of the tagged synchronized data streams to an optical receiver.

In one example, the system further comprises a differential encoder for receiving the synchronized data streams from the at least one re-framing and tagging module. The differential encoder is operable to encode at least one of phase and amplitude of signals associated with the synchronized data streams prior to the high order modulator performing the $2^N$ level optical modulation.

In another example, the system further comprises a multiplexer for performing at least one of polarization multiplexing, sub-carrier multiplexing and time division multiplexing of the tagged synchronized data streams.

In one alternative, the at least one unframing and synchronizing module comprises a first set of unframing and synchronizing modules for operating on a first set of the asynchronous data streams to produce a first set of synchronous data streams and a second set of unframing and synchronizing modules for operating on a second set of the asynchronous data streams to produce a second set of synchronous data streams. Here, the at least one re-framing and tagging module comprises a first set of re-framing and tagging modules for operating on corresponding ones of the first set of synchronous data streams to produce a first set of the tagged synchronous data streams and a second set of re-framing and tagging modules for operating on corresponding ones of the second set of synchronized data streams to produce a second set of the tagged synchronized data streams. The high order modulator comprises a first high order modulator for performing the $2^N$ level optical modulation on the first set of the tagged synchronized data streams to produce a first optically modulated signal and a second high order modulator for performing the $2^N$ level optical modulation on the second set of the tagged synchronized data streams to produce a second optically modulated signal. And the multiplexer is operable to receive the first and second optically modulated signals and perform the polarization multiplexing thereon to generate a single multiplexed optical signal prior to transmission to the optical receiver.

In another alternative, the at least one unframing and synchronizing module comprises a first set of unframing and synchronizing modules for operating on a first set of the asynchronous data streams to produce a first set of synchronous data streams and a second set of unframing and synchronizing modules for operating on a second set of the asynchronous data streams to produce a second set of synchronous data streams. Here, the at least one re-framing and tagging module comprises a first set of re-framing and tagging modules for operating on corresponding ones of the first set of synchronous data streams to produce a first set of the tagged synchronous data streams and a second set of re-framing and tagging modules for operating on corresponding ones of the second set of synchronized data streams to produce a second set of the tagged synchronized data streams. The high order modulator comprises a first high order modulator for performing the $2^N$ level optical modulation on the first set of the tagged synchronized data streams to produce a first optically modulated signal and a second high order modulator for performing the $2^N$ level optical modulation on the second set of the tagged synchronized data streams to produce a second optically modulated signal. And the multiplexer is operable to receive the first and second optically modulated signals and perform the sub-carrier multiplexing thereon to generate a single multiplexed optical signal prior to transmission to the optical receiver.

In a further alternative, the at least one unframing and synchronizing module comprises a plurality of unframing and synchronizing modules, each of the plurality of unframing and synchronizing modules being configured to operate on a corresponding set of the asynchronous data streams to produce a corresponding set of synchronous data streams. The at least one re-framing and tagging module comprises a plurality of re-framing and tagging modules. Each of the plurality of re-framing and tagging modules is configured to operate on a corresponding one of the of synchronous data streams to produce a corresponding tagged synchronous data stream. Here, the multiplexer comprises a plurality of time division multiplexers. Each of the time division multiplexers is operable to multiplex a set of the tagged synchronous data streams and generate a time division multiplexed signal. And the high order modulator is operable to receive the time division multiplexed signals from the plurality of time division multiplexers and to perform the $2^N$ level optical modulation thereon.

In another example, the system further comprises a plurality of optical to electrical converters for converting the N asynchronous data streams from optical signals to electrical signals prior to the at least one module performing the unframing and synchronizing on the asynchronous data streams. In a further example, the system further comprises a wavelength division multiplexer for multiplexing a signal from the high order modulator with one or more other optical signals prior to transmission to the optical receiver. And in yet another example, the high order modulator is operable to perform the $2^N$ level optical modulation using phase shift keying or quadrature amplitude modulation.

In accordance with another embodiment, a method of optically transmitting data comprises receiving a plurality of N asynchronous data streams; performing unframing on each of the plurality of N asynchronous data streams; synchronizing the plurality of N asynchronous data streams; reframing and tagging the synchronized data streams to map the data into a structured transmission frame including a tag to identify one or more specific ones of the data streams; and performing $2^N$ level optical modulation of the reframed and tagged synchronized data streams to produce a high order modulated signal configured for transmission to an optical receiver.

In one example, the method further comprises differential encoding the synchronized data streams with at least one of phase and amplitude of signals associated with the synchronized data streams prior performing the $2^N$ level optical modulation.

In another example, the method further comprises performing multiplexing of the reframed and tagged synchronized data streams. Here, the multiplexing includes at least one of polarization multiplexing, sub-carrier multiplexing and time division multiplexing.

In one alternative, the unframing and synchronizing produces a first set of synchronous data streams and a second set of synchronous data streams; the reframing and tagging produces a first set of the reframed and tagged synchronized data streams from the first set of synchronous data streams and a second set of the reframed and tagged synchronized data streams from the second set of synchronous data streams; the $2^N$ level optical modulation includes performing high order modulation on the first set of the reframed and tagged synchronized data streams to produce a first high order modulated signal and performing the high order modulation on the second set of the tagged synchronized data streams to produce a second high order modulated signal; and the multiplexing includes performing the polarization multiplexing on the first and second high order modulated signals to generate a single multiplexed optical signal prior to transmission to the optical receiver.

In another alternative, the unframing and synchronizing produces a first set of synchronous data streams and a second set of synchronous data streams; the reframing and tagging produces a first set of the reframed and tagged synchronous data streams from the first set of synchronous data streams and a second set of the reframed and tagged synchronized data streams from the second set of synchronous data streams; the $2^N$ level optical modulation includes performing high order modulation on the first set of the reframed and tagged synchronized data streams to produce a first high order modulated signal and performing the high order modulation on the second set of the tagged synchronized data streams to produce a second high order modulated signal; and the multiplexing includes performing the sub-carrier multiplexing on the first and second high order modulated signals to generate a single multiplexed optical signal prior to transmission to the optical receiver.

In a further alternative, the unframing and synchronizing produces a first set of synchronous data streams and a second set of synchronous data streams; the reframing and tagging produces a first set of the reframed and tagged synchronous data streams from the first set of synchronous data streams and a second set of the reframed and tagged synchronized data streams from the second set of synchronous data streams; the multiplexing includes performing a first time division multiplexing operation on the first optically modulated signal to generate a first time division multiplexed signal and performing a second time division multiplexing operation on the second optically modulated signal to generate a second time division multiplexed signal; and the $2^N$ level optical modulation includes performing the $2^N$ optical modulation on the first and second time division multiplexed signals.

In another example, the method further comprises converting the N asynchronous data streams from optical signals to electrical signals prior to performing the unframing and synchronizing. In yet another example, the method further comprises performing wavelength division multiplexing on the high order modulated signal with one or more other optical signals prior to transmission to the optical receiver. And in another example, the $2^N$ level optical modulation employs phase shift keying or quadrature amplitude modulation.

In a further embodiment, an optical transceiver comprises at least one module for performing unframing by removing framing information from a plurality of N asynchronous data streams and for synchronizing the asynchronous data streams. The transceiver also comprises at least one module for re-framing the synchronized data streams and for tagging the synchronized data streams with encoded stream information and a high order modulator operable to perform $2^N$ level optical modulation of the tagged synchronized data streams prior to transmission of the tagged synchronized data streams to an optical receiver. The transceiver further comprises an optical receiver module operable to receive tagged synchronized data streams from a remote high order modulator and perform at least one of demodulation and detection on the received tagged synchronized data streams to output a received set of streams, a decoder operable to decode the received set of streams to generate decoded streams, and at least one module for re-framing the decoded streams.

In one example, the optical transceiver further comprises means for performing tag identification and reordering on the decoded streams prior to re-framing thereof. In another example, the optical transceiver further comprises means for performing signal conditioning on the received set of streams to clean up transmission impairments in the received set of streams. In yet another example, the optical receiver module is operable to perform direct detection with balanced photodetectors to extract differential phase information from the received tagged synchronized data streams. And in another example, the optical receiver module includes one or more local oscillators operable to perform coherent detection to extract phase states from the received tagged synchronized data streams.

DETAILED DESCRIPTION

The aspects, features and advantages of the present invention will be appreciated when considered with reference to the following description of embodiments and accompanying figures. The same reference numbers in different drawings may identify the same or similar elements. Furthermore, the following description does not limit the present invention; rather, the scope of the invention is defined by the appended claims and equivalents.

As presented herein, optical systems according to embodiments of the invention use high order modulation to transmit multiple bits per symbol. Such systems may employ differential encoding with a data stream identifier to recover data streams at a receiver. As will be explained in more detail below, either direct detection using balanced receivers or coherent detection using an optical local oscillator may be used by the receiver.

Figure 1:
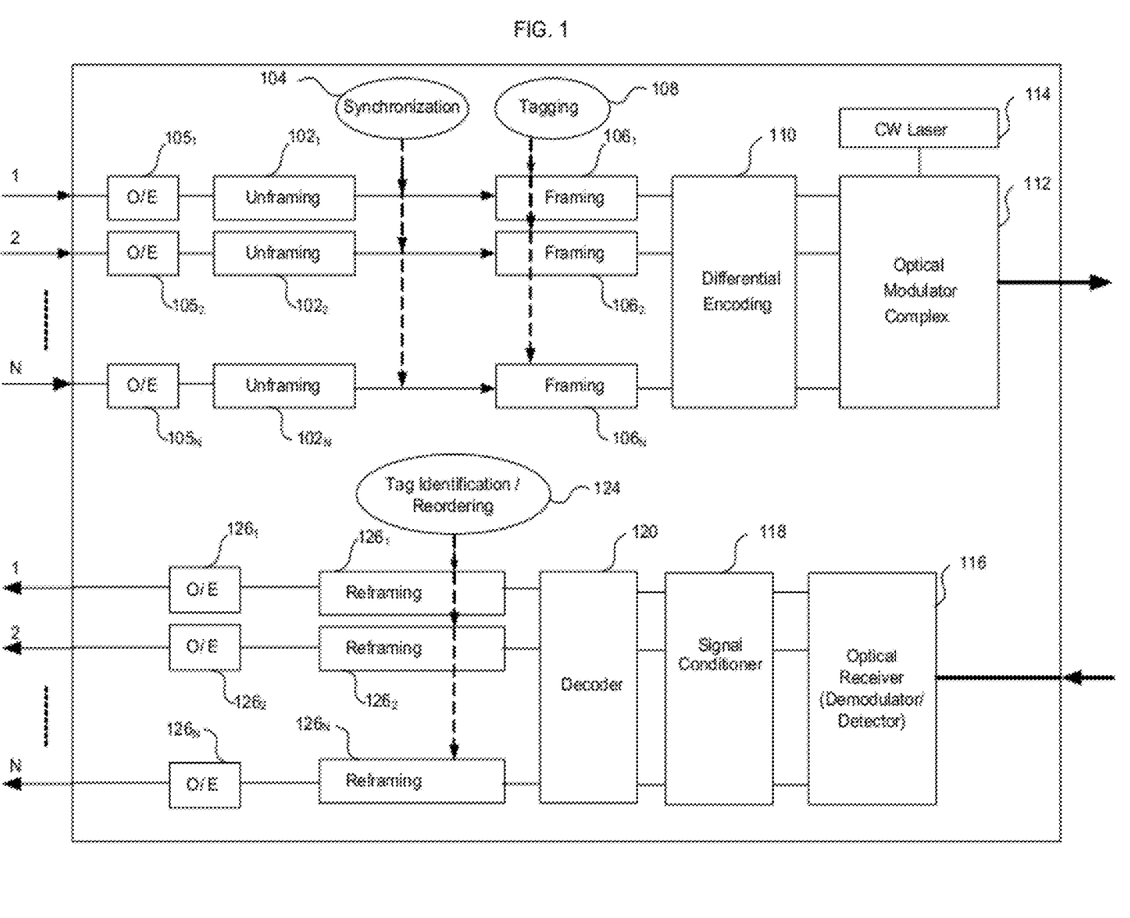
FIG. 1 illustrates an exemplary optical transceiver architecture in accordance with one aspect of the invention.

FIG. 1 is a block diagram illustrating an optical transceiver system 100 according to aspects of the invention. The system 100 employs multiple lower speed client signals on the input side, and a higher speed signal on a DWDM wavelength on the output side. As shown in this embodiment, a plurality of N asynchronous data streams is input to the system 100. The N data streams may each be of a slightly different data rate, for instance with each stream at a given data rate of R gigabit/sec, typically within +/−100 ppm difference. The N streams are passed through payload level un-framing modules 102 and synchronized at synchronization block 104. The un-framing modules 102 remove Infiniband, Ethernet or SONET framing. The data streams are aligned with synchronization block 104. For transmission scenarios employing synchronization, synchronization block 104 enables all streams to be re-timed from the same reference clock such that they are all transmitting at the same data rate. The un-framing and synchronization may be done separately or concurrently in the same or different equipment. Prior to reception by the un-framing modules $102_1$-$102_N$, the data streams may be converted from optical to electrical signals via converter modules $105_1$-$105_N$. These converter modules 105 may be omitted if the incoming streams are received as electrical signals instead of optical signals.

Subsequently, the streams are re-framing with one or more framing modules 106 and tagged at block 108 to recover the data of the streams. The framing modules 106 add information such as a header or marker to the stream, and tagging block 108 encodes stream information. The reframing and tagging may be done separately or concurrently in the same or different equipment. The framing and tagging sections perform the function of mapping the incoming client data into a structured transmission frame of fixed size and adds header information. As part of this header information, a tag is added to identify a specific client stream. This tag is used to recover that client stream at the receiver location.

The streams are then desirably provided to a differential encoder 110, which encodes the phase and/or amplitude of the signals. Desirably, the differential encoding is performing using a data stream identifier to enable recovery of the data streams at the receiver. The data stream identifier may be a simple 3 or 4 bit binary code, e.g., 100 or 1011. The differentially encoded signals are then sent to an optical modulator complex 112. Here, the data of the individual streams is mapped to multiple constellation points, for example using gray coding, on an n-level modulation signal. Each of these constellations (representing a combination of amplitude and phase modulation) are modulated on a carrier wave generated by continuous wave (CW) laser 114, and multiple instances of these modulated optical signals are multiplexed together for transmission over a DWDM wavelength via a fiber optic cable.

In one example, the high order modulation uses 16 QAM to transmit 4 bits/symbol. In this example, the symbol (baud) rate may be 10 Gb/s with a bit rate of 40 Gb/s. This allows for transmission of four asynchronous 10 Gb/s data streams with a single WDM wavelength, and using a 50 GHz wavelength grid. Thus, the system is able to maintain a low baud rate while enabling a high bit rate for high spectral efficiency. In other examples as explained below, the high order modulation may be used in combination with one or more additional modulation schemes. These include polarization multiplexing, sub-carrier multiplexing and intermediate TDM multiplexing.

On the receiver side as shown in FIG. 1, the DWDM signals are input to an optical receiver module 116, which functions as a demodulator and/or detector. It converts the optical signals to electrical signals. In one example, the receiver module 116 may perform direct detection with balanced photodetectors to extract differential phase information. In another example, the receiver module 116 may employ local oscillator based coherent detection with an optical hybrid to extract phase states. The module 116 may be used with or without a digital signal processor ("DSP") back end for signal clean up.

A signal conditioner 118 may be included as part of system 100. If it is included, the signal conditioner 118 is used to clean up transmission impairments such as dispersion, compensating for the impairments after the signal has traversed the length of fiber. The signal conditioner 118 desirably includes compensation for chromatic dispersion, e.g., using Finite Impulse Response ("FIR") filters or maximum likelihood sequence estimators (MLSE), and phase and polarization recovery. This is achieved using known adaptive equalization algorithms. The resultant streams are decoded with decoder 120. Reframing is done by individual reframing modules $122_1$-$122_N$. At this time, tag identification and/or reordering is accomplished at block 124. Tag identification and reordering (if necessary), can be performed before the reframing process takes place. The reframing, tagging and reordering may be done separately or concurrently in the same or different equipment. Then electrical to optical converter modules $126_1$-$126_N$ may be used to convert the signals back into N optical data streams, which are passed onto downstream equipment (not shown). Alternatively, the optical converter modules 126 may be omitted when electrical signals are send to the downstream system.

Figure 2:
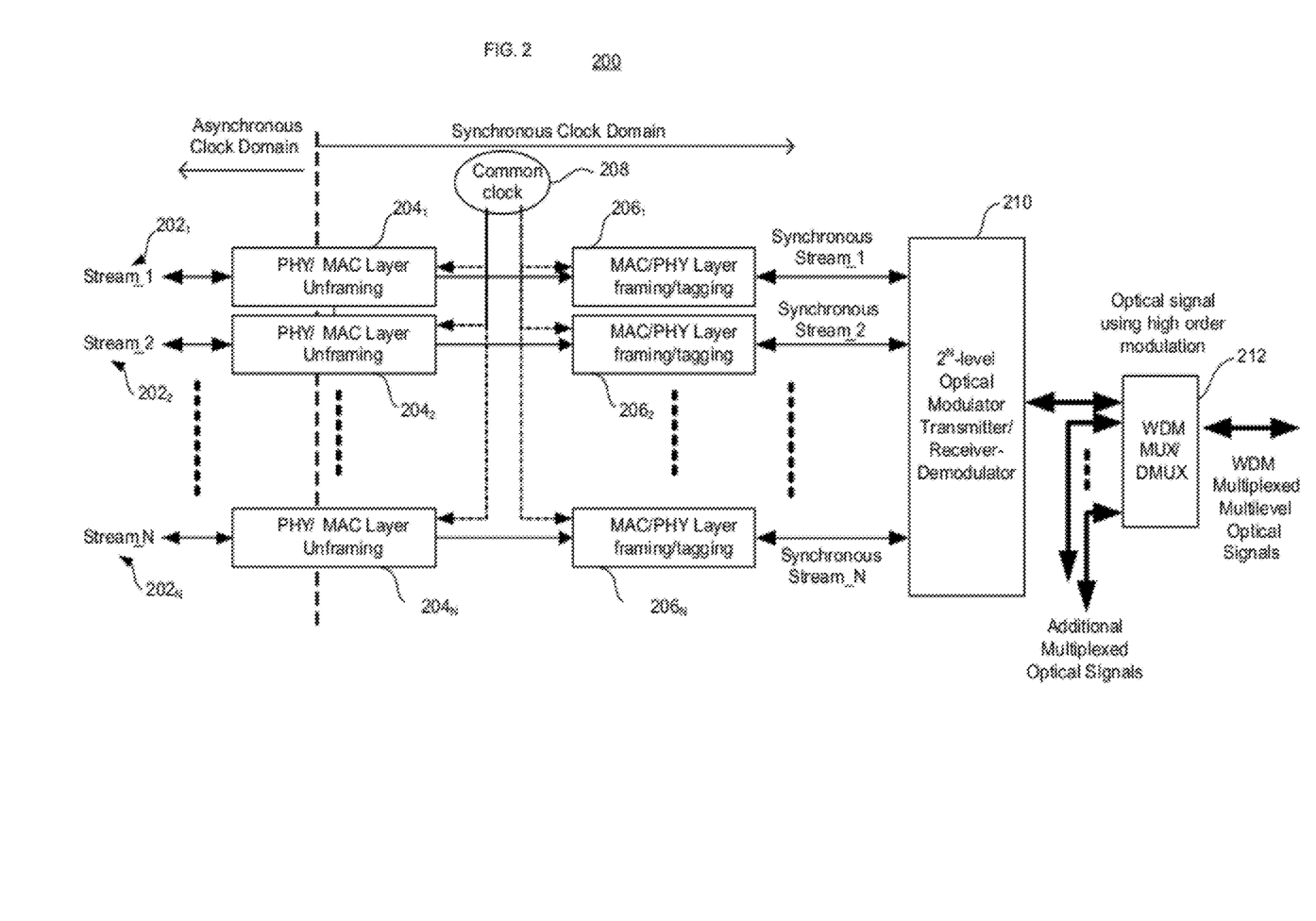
FIG. 2 illustrates conversion of multiple asynchronous data streams to synchronous streams in accordance with aspects of the invention.

In accordance with the above discussion, FIG. 2 illustrates an exemplary system 200 for transporting multiple asynchronous data streams $202_1$-$202_N$ as an optical signal with high order modulation. The figure shows wavelength multiplexing of multiple modulated signals (N streams) before transmission over an optical fiber. The separation between the asynchronous and the synchronous clock domains is achieved through remapping (e.g., unframing as shown in blocks $204_1$-$204_N$) of the asynchronous data streams into PHY and/or MAC layer frames and then reframing them synchronously (e.g., framing and tagging as shown in blocks $206_1$-$206_N$) using a common reference clock 208 as the synchronous reference.

The synchronous data streams are then modulated with multi-level modulation and multiplexed at block 210, for instance as explained with regard to modulator complex 112 of FIG. 1. For N synchronous bit streams, a $2^N$ symbol modulation scheme is used such that each of the synchronous streams can be treated as one bit in a N-bit symbol that is then mapped into $2^N$ symbol modulated stream. Each of those modulated stream can be carried on a pre-specified carrier wavelength for further multiplexing in the wavelength domain. Additional multiplexed optical signals may be added to the WDM multiplexed signals prior to transmission, as shown in block 212. The reverse process is employed on received signals to obtain the asynchronous data streams $202_1$-$202_N$.

Figure 3:
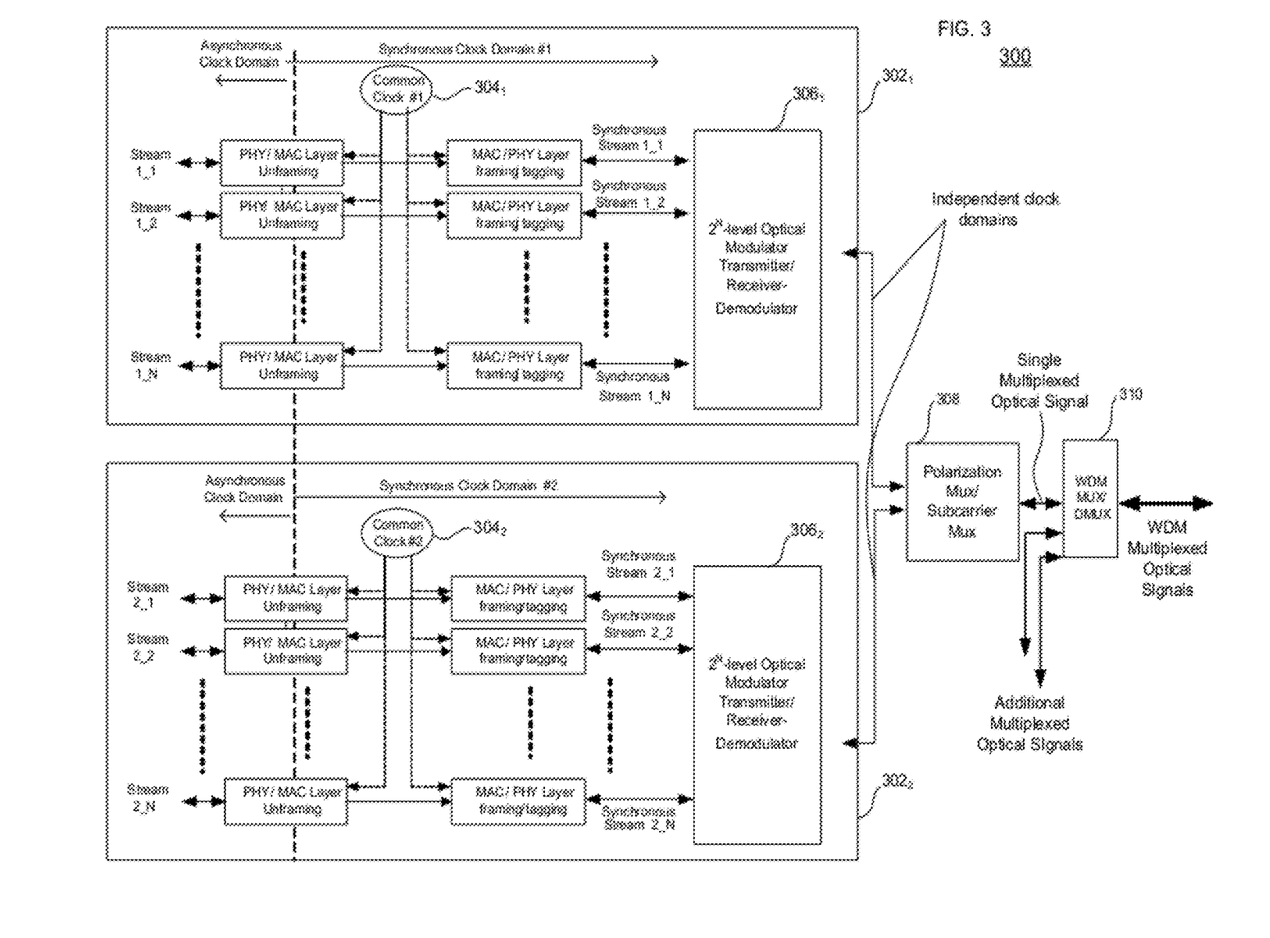
FIG. 3 illustrates the use of polarization and sub-carrier multiplexing with high-order modulation in accordance with aspects of the invention.

As explained above, additional modulation schemes may be employed along with high order modulation. FIG. 3 provides an exemplary architecture 300, which combines high order modulation with a second orthogonal multiplexing method (e.g., polarization or sub-carrier multiplexing). In this embodiment, the clock domains for the polarization or sub-carrier multiplexing can be completely independent. For instance, as shown there are two sets of streams ($1_1$-$1_N$ and $2_1$ to $2_N$) processed by respective blocks $302_1$ and $302_2$. Upon completion of the unframing processing, the upper set of streams ($1_1$-$1_N$) has a first common clock $304_1$ and the lower set of streams ($2_1$ to $2_N$) has a second common clock $304_2$. The first and second common clocks are desirably independent of one another. For instance, the clocks may be selected on a per-line card basis. Each line card typically represents one or two wavelengths.

The transmit and receive processing of the stream sets shown in FIG. 3 may proceed as discussed above with regards to FIGS. 1 and 2, subject to the further multiplexing as discussed below. On the transmit side, once the separate stream sets ($1_1$-$1_N$ and $2_1$ to $2_N$) have been processed by their respective optical modulator complexes $306_1$ and $306_2$, which function as block 210 in FIG. 2 and the optical modulator complex 112 in FIG. 1, they are multiplexed together in block 308, for instance either by polarization multiplexing or sub-carrier multiplexing. Polarization multiplexing may be done using a Polarization Beam Combiner ("PBC"). Subcarrier multiplexing may be done with an FPGA or ASIC or other mechanism by which a comb of sub-carriers (typically spaced much closer than the DWDM grid) are multiplexed using a series of modulators and RF combined and followed by a RF-to-optical upconverter to modulate the laser source. The resultant output from block 308 is a single multiplexed optical signal that is then sent to a WDM multiplexer 310. Here, as with WDM multiplexer 212, additional multiplexed optical signals may be added and the resultant optical stream is ready for transmission via an optical cable (not shown). On the receiving side, the reverse processing occurs, where the input from the optical cable is WDM demultiplexed and any additional multiplexed optical signals are removed prior to polarization or sub-carrier demultiplexing.

Sub-carrier multiplexing in the present embodiment may employ co-carriers or multiple carriers. With sub-carrier modulation, an additional set of transmitters and receivers are used, but the composite optical spectrum can be transmitted through a single ITU grid window, making it more spectrally efficient. The total number of data streams supported increases by a factor equal to the number of sub-carriers (e.g., 2).

Figure 4:
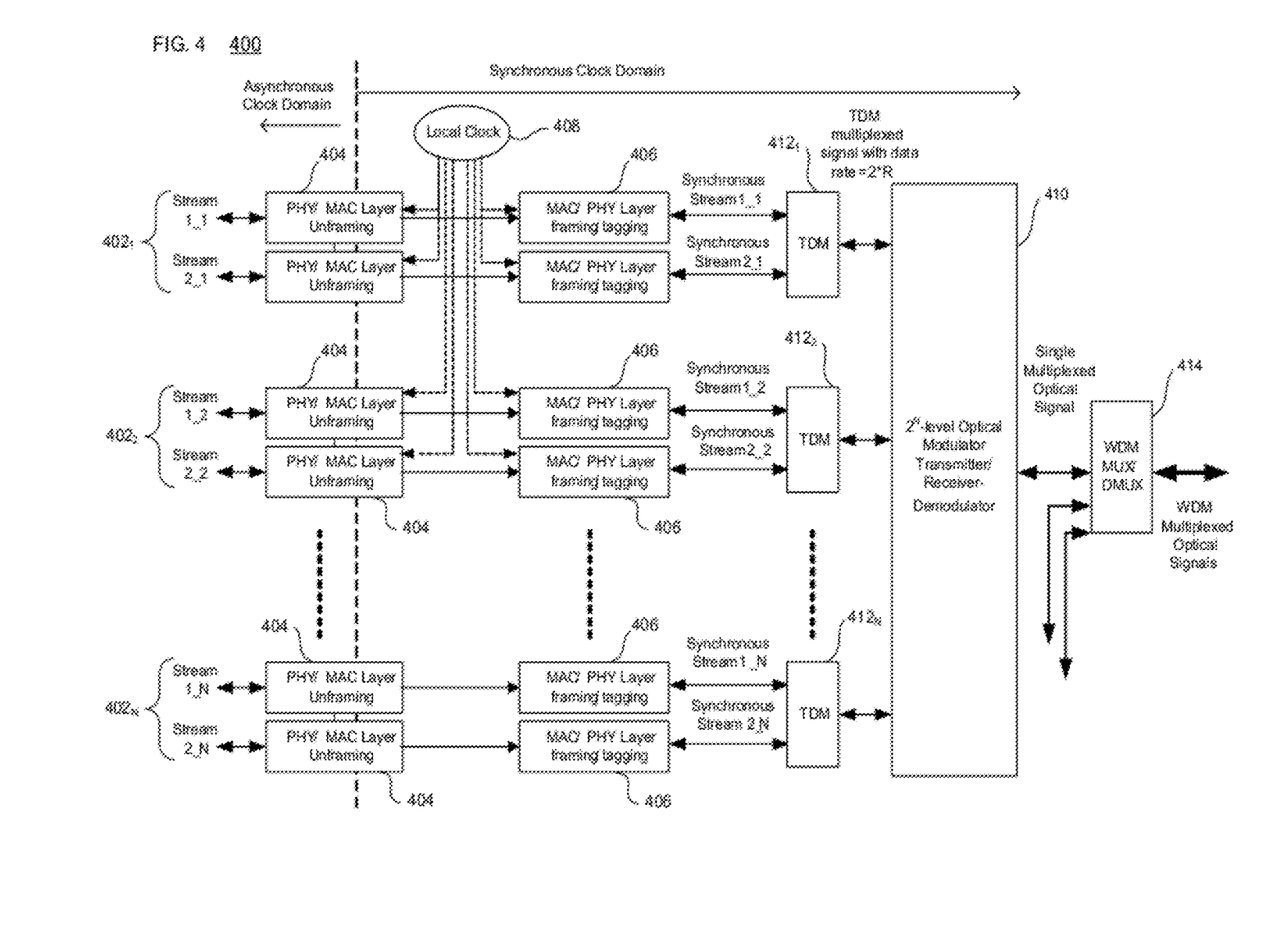
FIG. 4 illustrates time division multiplexing with high-order modulation in accordance with aspects of the invention.

FIG. 4 shows an exemplary system 400 that includes a combination of high-order modulation with an intermediate TDM multiplexing stage. In this embodiment, the TDM stage synchronously multiplexes the two incoming streams using a common clock. As shown, the system 400 is arranged in a similar manner to system 200 of FIG. 2. Here, different sets (e.g., pairs) of asynchronous streams $402_1$, $402_2$, ..., $402_N$ are processed by unframing modules 404 and framing/tagging modules 406 using timing from a common local clock 408 to become corresponding pairs of synchronous streams. Prior to modulating with multi-level modulation at block 410, each synchronous stream pair is time division multiplexed at respective block 412 to produce a multiplexed signal.

The intermediate TDM multiplexing stage (blocks $412_1$-$412_N$) increases the data rate to enable more incoming data streams to be supported. For example, using only high-order modulation, a constellation size of $2^N$ with a symbol rate of R supports N streams each operating at a data rate of R. With the use of the intermediate TDM stage in this embodiment, the symbol rate of the output signal is increased to R*T, where T is the number of data streams multiplexed in the intermediate TDM stage, and the total number of data streams supported is now N*T. Equivalently (or alternatively), the intermediate stage reduces the constellation size. In the present example, two data streams are TDM multiplexed together at each block 412; however, additional streams may also be added. For instance, four or more streams can be multiplexed together. And as discussed above with regard to WDM multiplexer 212, additional multiplexed optical signals may be added at WDM multiplexer 414 before the resultant optical stream is transmitted.

While several different arrangements have been discussed, any combination of features therein may be employed with high-order modulation. Thus, in one example, a system may include any or all of polarization multiplexing, sub-carrier multiplexing and TDM multiplexing in conjunction with high-order modulation. In addition, multiple streams formed by such processing may be combined using wavelength division multiplexing.

For the various combinations presented above, some methods need synchronization while the others do not. The present invention is applicable for any combination of methods involving a synchronous or an asynchronous mapping method. Table 1 below illustrates various multiplexing methods and identifies whether individual streams need to be synchronized.

TABLE 1

Multiplexing Methods and Synchronization

| Multiplexing method | Individual streams to be synchronized? |
| --- | --- |
| High-order modulation | Yes |
| Polarization Multiplexing | No |
| Sub-carrier Multiplexing | No |
| Intermediate TDM multiplexing | Yes |

Figure 5A:
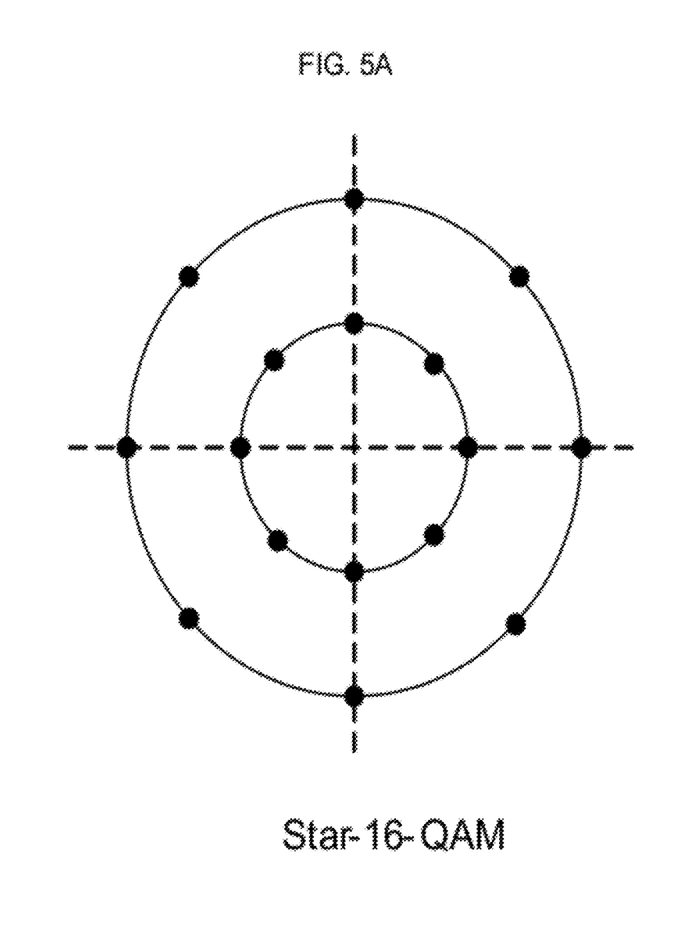
FIGS. 5A-B illustrate exemplary high-order modulation constellations for use with aspects of the invention.
Figure 5B:
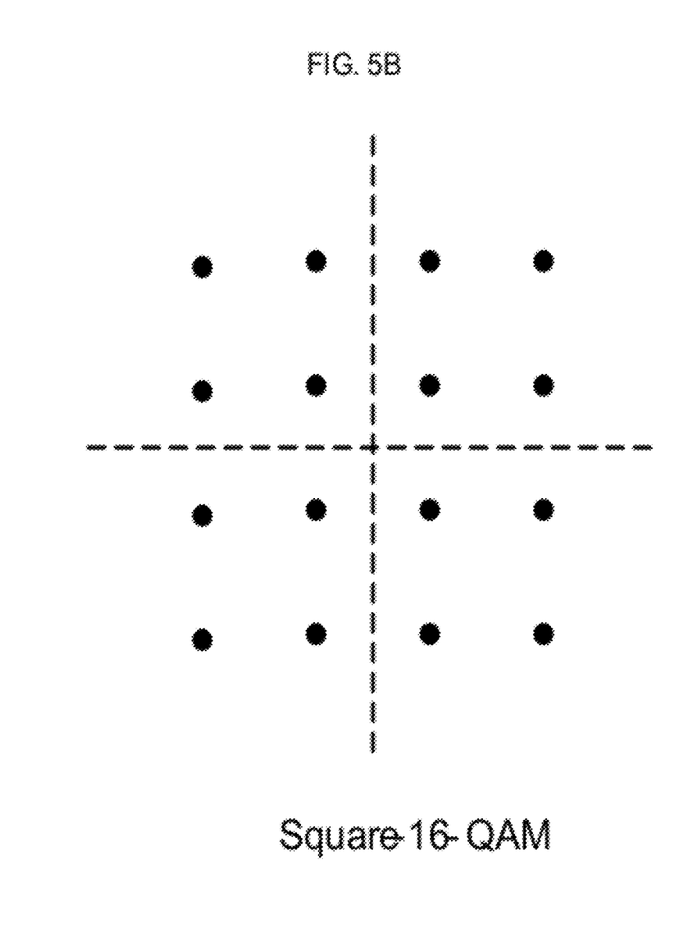

In accordance with one aspect of the invention, the type of constellation used for the high-order modulation may be any combination of phase and amplitude, as well as any shape. Exemplary constellations include QPSK or 8-PSK for phase only modulation, and 16-QAM for phase and amplitude. Examples of constellation shape variation are star or square constellations. FIGS. 5A-B illustrate two types of 16-QAM constellations, where FIG. 5A presents a star configuration and FIG. 5B illustrates a square configuration. It should be understood that the x and y axes may rotate due to phase rotation during transmission. Tagging is used to address this issue, where the receiver uses the tag information to determine which streams are encoded. Tagging is addressed in more detail below.

The size of the constellation may be arbitrary, and may depend on the size of the Link Aggregation Group ("LAG") of the incoming data streams. For example, 16-QAM (with 4 bits/symbol) can be used to transport 4 data streams, each running at 10 Gb/s, over a modulated signal operating at 40 Gb/s. Similarly, 256-QAM (with 8 bits/symbol) can be used to transport 8 data streams, each operating at 10 Gb/s, over a modulated signal operating at 80 Gb/s.

The above described modulation schemes on the transmit side are combined with equivalent methods of demodulation/demultiplexing at the receiver to complete the transmission link. For the primary method described above employing high-order modulation, the receiver circuitry can employ either direct detection without a local oscillator or coherent detection with a local oscillator. The various possibilities are discussed below.

One option is to perform direct detection without a signal processing block. In one embodiment, this is a preferred implementation for cost and power efficiencies, for links where adequate optical performance is possible without additional signal processing blocks. In this approach, no local oscillator is used. Instead, direct detection is employed to recover the relative phase states and thereby extract the differentially encoded signals on the phase states. For instance, balanced photodetectors may be used to extract the differential phase information.

Another option is direct detection using a signal processing block. Here, a backend signal processing block is used for phase recovery, chromatic and polarization dispersion compensation, and partial clean-up of non-linear effects and polarization noise. The signal processing block can be implemented either as an analog block or a digital block. A digital signal processing block is accompanied by an analog to digital (A/D) converter.

A third option is to use a local oscillator with a signal processing block. In this case, the local oscillator enables coherent detection of the incoming signal by combining the local oscillator with the incoming signal through a 90-degree hybrid complex using either homodyne or heterodyne techniques. These extracted states may be post-processed using a signal processing block, such as a DSP back end, for signal cleanup.

As discussed above, tagging is performed after unframing, as shown in FIG. 1. According to one aspect of the invention, a method is used to tag one or all of the data streams with a unique bit sequence to identify that data stream and recover it at the receiver. In one preferred example where the system performs relative phase recovery and not absolute phase recovery, this method of tagging is used to identify the recovered data stream. Depending on the modulation scheme, one or more data streams (up to the maximum number of data streams) are tagged to enable the recovery and identification of the data streams.

Figure 6:
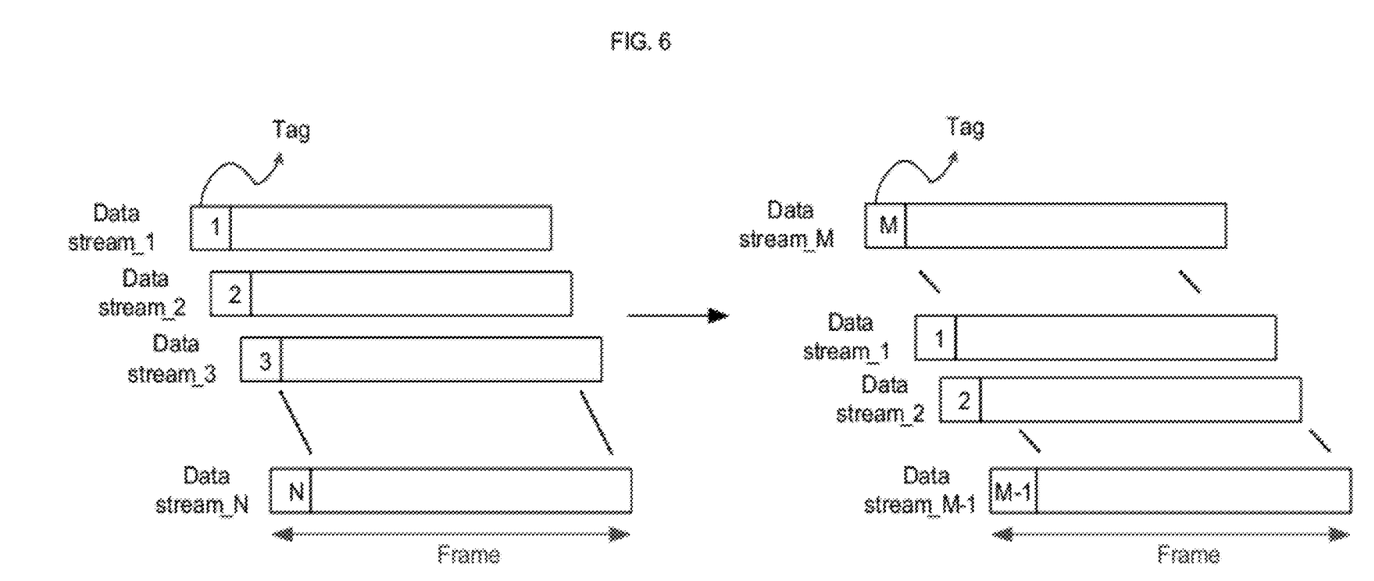
FIG. 6 illustrates one method of frame identification using an embedded tag in accordance with an aspect of the invention.

FIG. 6 illustrates one method of frame identification using an embedded tag for a channel if the relative phase of the data streams can be preserved during the transmission. In this scenario, identification of one data stream is sufficient to identify and extract the remaining data streams as they have a fixed and known phase relationship to each other. One way to incorporate the identification tag is to use a unique bit sequence in the frame preamble. As all the data streams using the high-order modulation are frame synchronous, all the data streams can be identified using this method.

For the other examples that are combined with the high-order modulation approach (e.g., polarization multiplexing, sub-carrier multiplexing and intermediate TDM multiplexing), the relationship between the individual data streams is known and thus the data streams can be recovered and appropriately identified using the same tagging procedure described above when the relationship among individual data streams can be preserved. No additional tags per multiplexing scheme are required.

Figure 7:
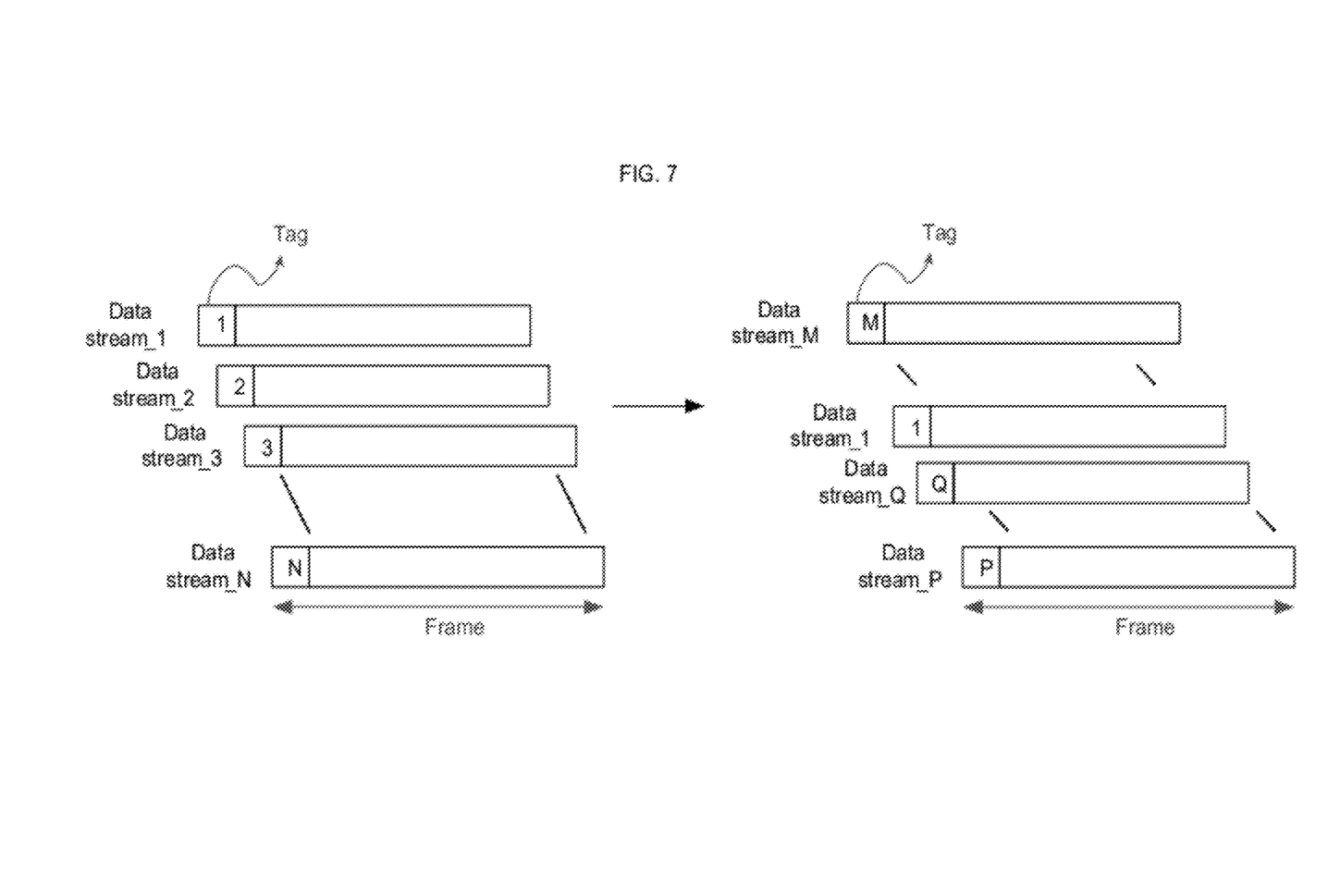
FIG. 7 illustrates a second method of frame identification using an embedded tag in accordance with another aspect of the invention.

FIG. 7 illustrates an alternative method of frame identification using the embedded tag for a channel. Here, the relative phase of the data streams is not preserved during the transmission. In this scenario, identification of all or more than one (between 1 and N depending on the modulation scheme) data stream is necessary to identify and extract the remaining data streams as they do not have a fixed and known phase relationship to each other.

Figure 8:
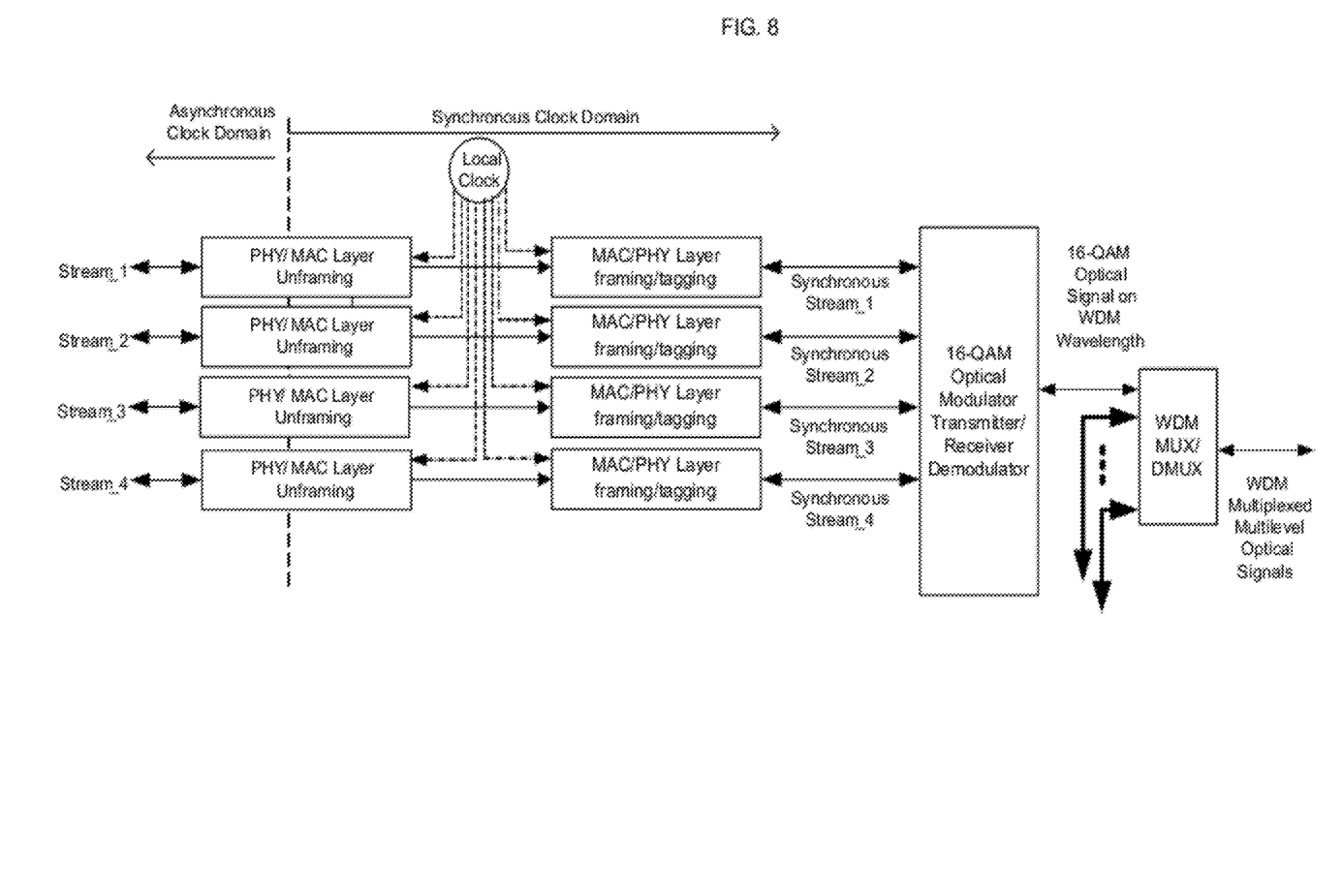
FIG. 8 illustrates a system using 16-QAM high order modulation in accordance with an aspect of the invention.
Figure 9:
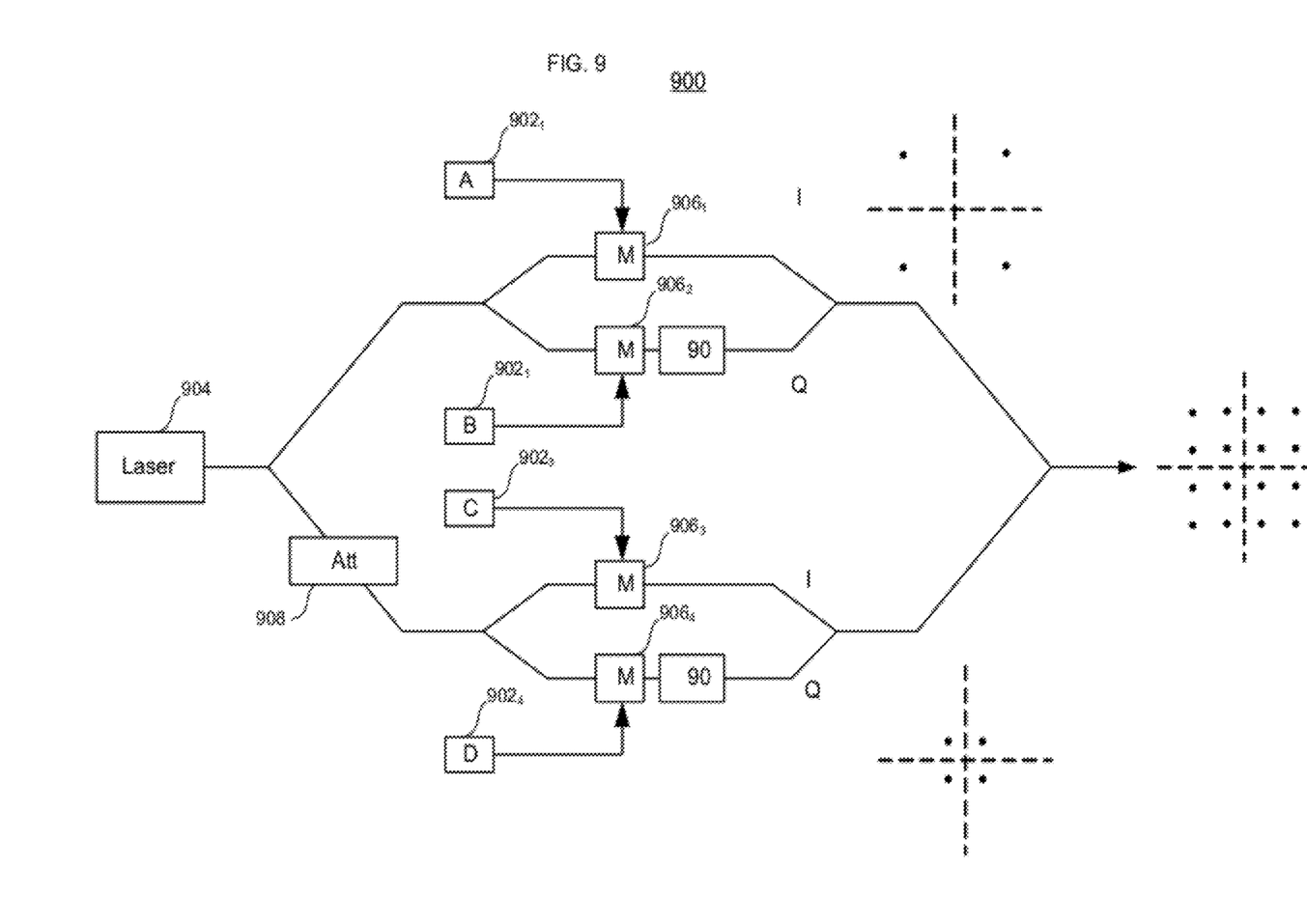
FIG. 9 illustrates an exemplary square 16-QAM transmitter configuration in accordance with an aspect of the invention.

As discussed above, different high-order modulation techniques may be employed with the different architectures presented herein. FIG. 8, which has the overall architecture shown in FIG. 2, illustrates a specific example that multiplexes four asynchronous data streams using 16-QAM modulation. And FIG. 9 shows an example of a transmitter implementation 900 for the 16-QAM square constellation. Here, the four encoded data streams $902_1$-$902_4$ are represented as A, B, C and D, respectively. A beam from laser 904 is split and provided to four modulators ("M") $906_1$-$906_4$. In one example, the modulators 906 are Mach-Zehnder modulators (MZM). As shown, the lower branch of the laser signal is attenuated by attenuator 908 or splitter with lower splitting ratio. The lower branch is attenuated in this case as it is a combination of phase and amplitude modulation. Mach-Zehnder modulators provide phase modulation and the attenuator provides the amplitude attenuation needed. This is shown in the lower "cross" diagram where the four points are shown having a smaller amplitude than the four points of the upper "cross" diagram.

The signals output from modulators $906_1$ and $906_1$ are in phase ("I"), while the signals output from modulators $906_2$ and $906_4$ are (Quadrature) shifted by 90 degrees ("Q"). As shown, the I and Q components from the upper branches have a first constellation and the I and Q components from the lower branches have a second constellation, with the resultant constellation being the square 16-QAM.

Figure 10:
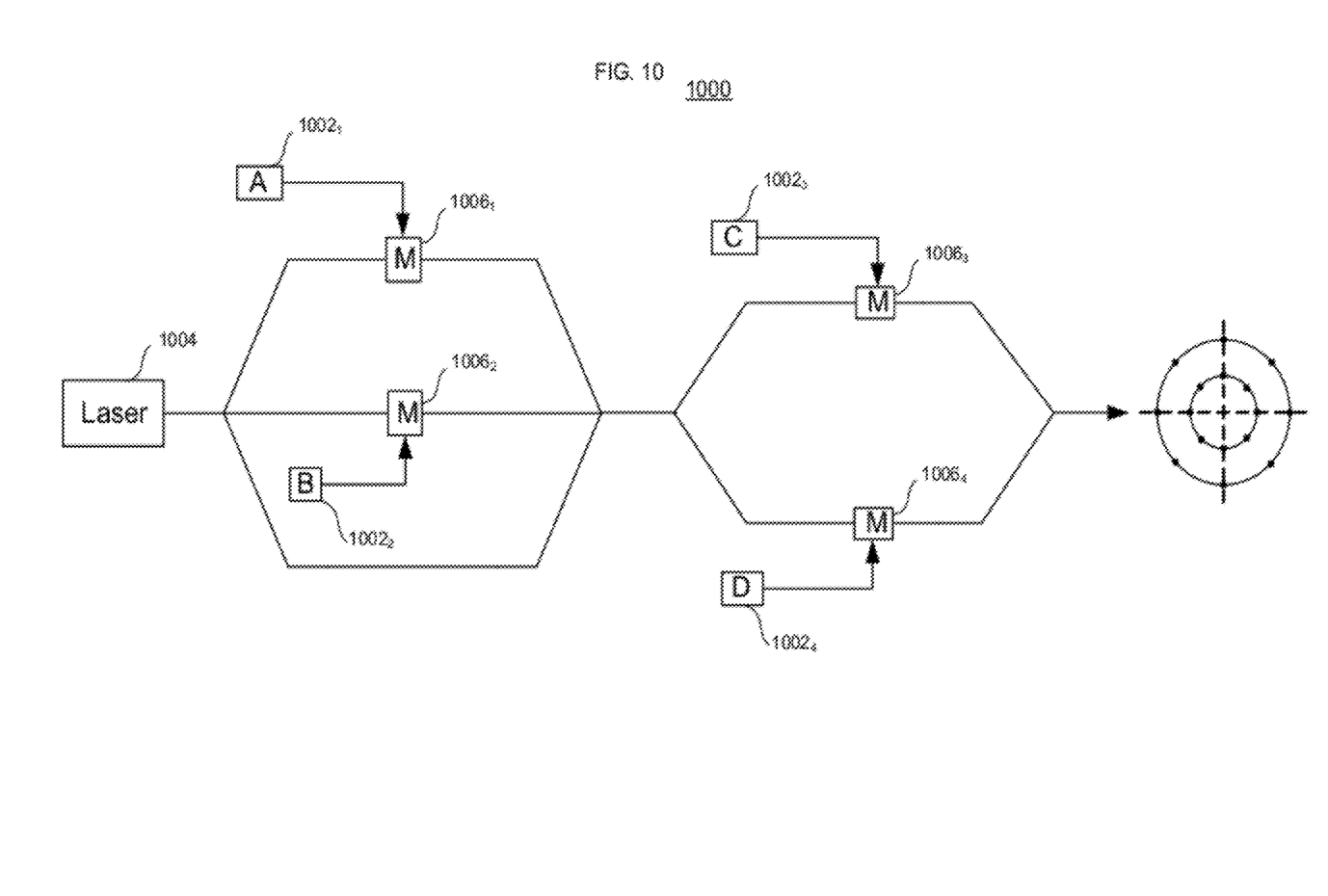
FIG. 10 illustrates an exemplary star 16-QAM transmitter configuration in accordance with an aspect of the invention.

FIG. 10 shows an example of an implementation of a transmitter implementation 1000 for a 16-QAM star constellation. Here, the four encoded data streams $1002_1$-$1002_4$ are represented as A, B, C and D, respectively. A beam from laser 1004 is split and provided to four modulators ("M") $1006_1$-$1006_4$. In one example, the modulators 1006 are Mach-Zehnder modulators. The resultant constellation is the 16-QAM star as shown.

Figure 11:
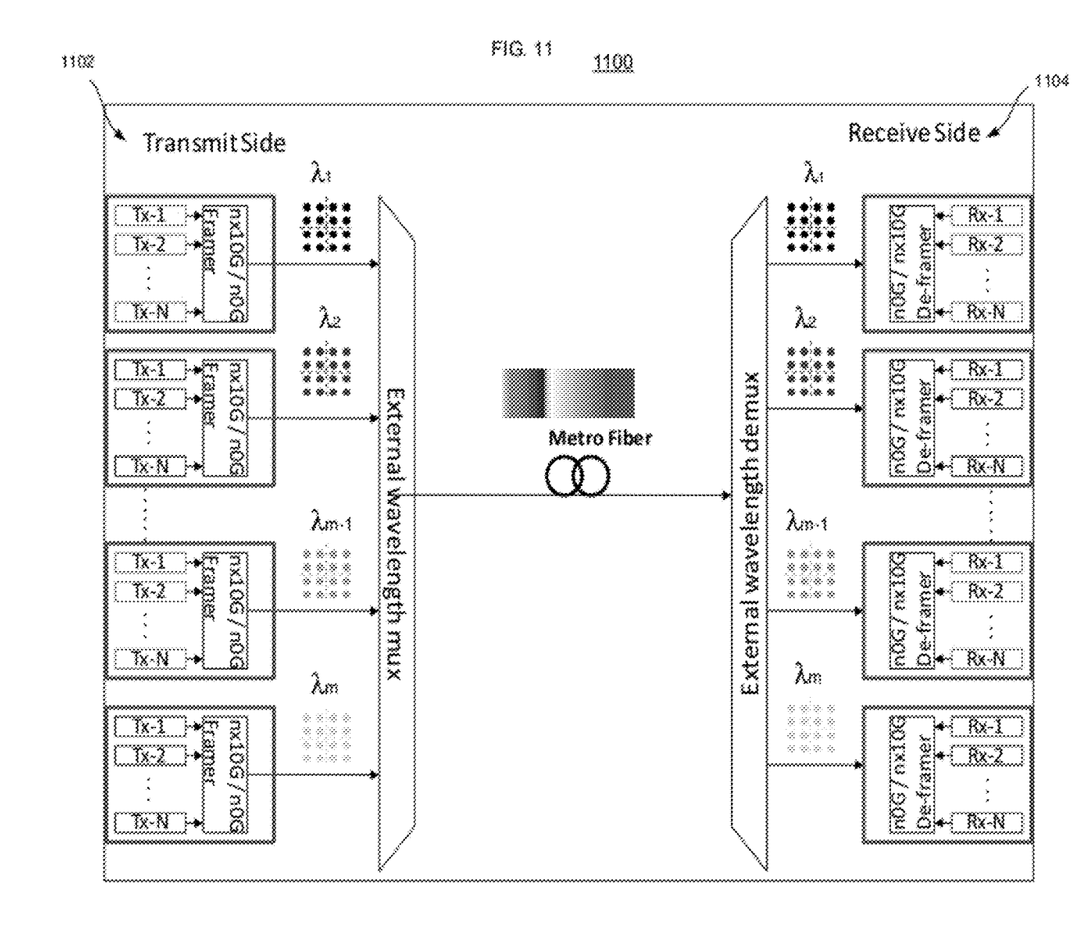
FIG. 11 illustrates exemplary transmitter and receiver operation in accordance with aspects of the invention.

FIG. 11 shows an exemplary system level application 1100. At the transmitter side 1102, a group of lower speed data-streams is mapped to single DWDM wavelength using high-order modulation. On the receiver side 1104, the incoming high-order modulated signal is de-framed into a group of lower speed data-streams.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An optical transmitter system, comprising:
at least one module for performing unframing by removing framing information from a plurality of N asynchronous data streams and for synchronizing the asynchronous data streams;
at least one module for re-framing the synchronized data streams and for tagging the synchronized data streams with encoded stream information; and
a high order modulator operable to perform $2^N$ level optical modulation of the tagged synchronized data streams prior to transmission of the tagged synchronized data streams to an optical receiver.

2. The optical transmitter system of claim 1, further comprising a differential encoder for receiving the synchronized data streams from the at least one re-framing and tagging module, the differential encoder being operable to encode at least one of phase and amplitude of signals associated with the synchronized data streams prior to the high order modulator performing the $2^N$ level optical modulation.

3. The optical transmitter system of claim 1, further comprising a multiplexer for performing at least one of polarization multiplexing, sub-carrier multiplexing and time division multiplexing of the tagged synchronized data streams.

4. The optical transmitter system of claim 3, wherein:
the at least one unframing and synchronizing module comprises a first set of unframing and synchronizing modules for operating on a first set of the asynchronous data streams to produce a first set of synchronous data streams and a second set of unframing and synchronizing modules for operating on a second set of the asynchronous data streams to produce a second set of synchronous data streams;
the at least one re-framing and tagging module comprises a first set of re-framing and tagging modules for operating on corresponding ones of the first set of synchronous data streams to produce a first set of the tagged synchronous data streams and a second set of re-framing and tagging modules for operating on corresponding ones of the second set of synchronized data streams to produce a second set of the tagged synchronized data streams;
the high order modulator comprises a first high order modulator for performing the $2^N$ level optical modulation on the first set of the tagged synchronized data streams to produce a first optically modulated signal and a second high order modulator for performing the $2^N$ level optical modulation on the second set of the tagged synchronized data streams to produce a second optically modulated signal; and
the multiplexer is operable to receive the first and second optically modulated signals and perform the polarization multiplexing thereon to generate a single multiplexed optical signal prior to transmission to the optical receiver.

5. The optical transmitter system of claim 3, wherein:
the at least one unframing and synchronizing module comprises a first set of unframing and synchronizing modules for operating on a first set of the asynchronous data streams to produce a first set of synchronous data streams and a second set of unframing and synchronizing modules for operating on a second set of the asynchronous data streams to produce a second set of synchronous data streams;
the at least one re-framing and tagging module comprises a first set of re-framing and tagging modules for operating on corresponding ones of the first set of synchronous data streams to produce a first set of the tagged synchronous data streams and a second set of re-framing and tagging modules for operating on corresponding ones of the second set of synchronized data streams to produce a second set of the tagged synchronized data streams;
the high order modulator comprises a first high order modulator for performing the $2^N$ level optical modulation on the first set of the tagged synchronized data streams to produce a first optically modulated signal and a second high order modulator for performing the $2^N$ level optical modulation on the second set of the tagged synchronized data streams to produce a second optically modulated signal; and
the multiplexer is operable to receive the first and second optically modulated signals and perform the sub-carrier multiplexing thereon to generate a single multiplexed optical signal prior to transmission to the optical receiver.

6. The optical transmitter system of claim 3, wherein:
the at least one unframing and synchronizing module comprises a plurality of unframing and synchronizing modules, each of the plurality of unframing and synchronizing modules being configured to operate on a corresponding set of the asynchronous data streams to produce a corresponding set of synchronous data streams;
the at least one re-framing and tagging module comprises a plurality of re-framing and tagging modules, each of the plurality of re-framing and tagging modules being configured to operate on a corresponding one of the of synchronous data streams to produce a corresponding tagged synchronous data stream;

the multiplexer comprises a plurality of time division multiplexers, each of the time division multiplexers being operable to multiplex a set of the tagged synchronous data streams and generate a time division multiplexed signal; and the high order modulator being operable to receive the time division multiplexed signals from the plurality of time division multiplexers and to perform the $2^N$ level optical modulation thereon.

7. The optical transmitter system of claim 1, further comprising a plurality of optical to electrical converters for converting the N asynchronous data streams from optical signals to electrical signals prior to the at least one module performing the unframing and synchronizing on the asynchronous data streams.

8. The optical transmitter system of claim 1, further comprising a wavelength division multiplexer for multiplexing a signal from the high order modulator with one or more other optical signals prior to transmission to the optical receiver.

9. The optical transmitter system of claim 1, wherein the high order modulator is operable to perform the $2^N$ level optical modulation using phase shift keying or quadrature amplitude modulation.

10. A method of optically transmitting data, the method comprising:
    receiving a plurality of N asynchronous data streams;
    performing unframing on each of the plurality of N asynchronous data streams;
    synchronizing the plurality of N asynchronous data streams;
    reframing and tagging the synchronized data streams to map the data into a structured transmission frame including a tag to identify one or more specific ones of the data streams; and
    performing $2^N$ level optical modulation of the reframed and tagged synchronized data streams to produce a high order modulated signal configured for transmission to an optical receiver.

11. The method of claim 10, further comprising differential encoding the synchronized data streams with at least one of phase and amplitude of signals associated with the synchronized data streams prior performing the $2^N$ level optical modulation.

12. The method of claim 10, further comprising performing multiplexing of the reframed and tagged synchronized data streams, the multiplexing including at least one of polarization multiplexing, sub-carrier multiplexing and time division multiplexing.

13. The method of claim 12, wherein:
    the unframing and synchronizing produces a first set of synchronous data streams and a second set of synchronous data streams;
    the reframing and tagging produces a first set of the reframed and tagged synchronized data streams from the first set of synchronous data streams and a second set of the reframed and tagged synchronized data streams from the second set of synchronous data streams;
    the $2^N$ level optical modulation includes performing high order modulation on the first set of the reframed and tagged synchronized data streams to produce a first high order modulated signal and performing the high order modulation on the second set of the tagged synchronized data streams to produce a second high order modulated signal; and
    the multiplexing includes performing the polarization multiplexing on the first and second high order modulated signals to generate a single multiplexed optical signal prior to transmission to the optical receiver.

14. The method of claim 12, wherein:
    the unframing and synchronizing produces a first set of synchronous data streams and a second set of synchronous data streams;
    the reframing and tagging produces a first set of the reframed and tagged synchronized data streams from the first set of synchronous data streams and a second set of the reframed and tagged synchronized data streams from the second set of synchronous data streams;
    the $2^N$ level optical modulation includes performing high order modulation on the first set of the reframed and tagged synchronized data streams to produce a first high order modulated signal and performing the high order modulation on the second set of the tagged synchronized data streams to produce a second high order modulated signal; and
    the multiplexing includes performing the sub-carrier multiplexing on the first and second high order modulated signals to generate a single multiplexed optical signal prior to transmission to the optical receiver.

15. The optical transmitter system of claim 12, wherein:
    the unframing and synchronizing produces a first set of synchronous data streams and a second set of synchronous data streams;
    the reframing and tagging produces a first set of the reframed and tagged synchronized data streams from the first set of synchronous data streams and a second set of the reframed and tagged synchronized data streams from the second set of synchronous data streams;
    the multiplexing includes performing a first time division multiplexing operation on the first optically modulated signal to generate a first time division multiplexed signal and performing a second time division multiplexing operation on the second optically modulated signal to generate a second time division multiplexed signal; and
    the $2^N$ level optical modulation includes performing the $2^N$ optical modulation on the first and second time division multiplexed signals.

16. The method of claim 10, further comprising converting the N asynchronous data streams from optical signals to electrical signals prior to performing the unframing and synchronizing.

17. The method of claim 10, further comprising performing wavelength division multiplexing on the high order modulated signal with one or more other optical signals prior to transmission to the optical receiver.

18. The method of claim 10, wherein the $2^N$ level optical modulation employs phase shift keying or quadrature amplitude modulation.

19. An optical transceiver, comprising:
    at least one module for performing unframing by removing framing information from a plurality of N asynchronous data streams and for synchronizing the asynchronous data streams;
    at least one module for re-framing the synchronized data streams and for tagging the synchronized data streams with encoded stream information;
    a high order modulator operable to perform $2^N$ level optical modulation of the tagged synchronized data streams prior to transmission of the tagged synchronized data streams to an optical receiver;

an optical receiver module operable to receive tagged synchronized data streams from a remote high order modulator and perform at least one of demodulation and detection on the received tagged synchronized data streams to output a received set of streams;

a decoder operable to decode the received set of streams to generate decoded streams; and at least one module for re-framing the decoded streams.

20. The optical transceiver of claim 19, further comprising means for performing tag identification and reordering on the decoded streams prior to re-framing thereof.

21. The optical transceiver of claim 19, further comprising means for performing signal conditioning on the received set of streams to clean up transmission impairments in the received set of streams.

22. The optical transceiver of claim 19, wherein the optical receiver module is operable to perform direct detection with balanced photodetectors to extract differential phase information from the received tagged synchronized data streams.

23. The optical transceiver of claim 19, wherein the optical receiver module includes one or more local oscillators operable to perform coherent detection to extract phase states from the received tagged synchronized data streams.

* * * * *